Figure 1:
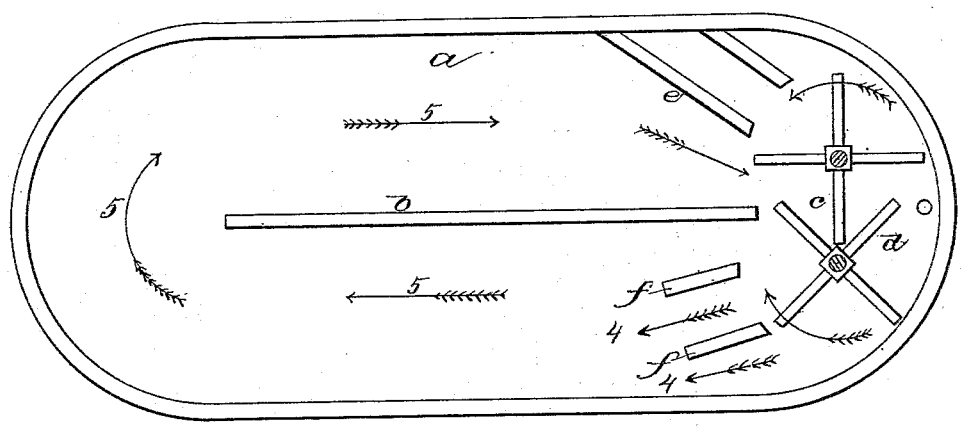

(No Model.)

O. NICHOLS.
METHOD OF MAKING PASTE.

No. 331,648.  Patented Dec. 1, 1885.

Witnesses
Fred L. Emery.
John F. C. Frinkert.

Inventor
Oldin Nichols.
by Crosby & Gregory
attys.

UNITED STATES PATENT OFFICE.

OLDIN NICHOLS, OF BOSTON, MASSACHUSETTS.

METHOD OF MAKING PASTE.

SPECIFICATION forming part of Letters Patent No. 331,648, dated December 1, 1885.

Application filed June 15, 1885. Serial No. 168,767. (No specimens.)

*To all whom it may concern:*

Be it known that I, OLDIN NICHOLS, of Boston, county of Suffolk, and State of Massachusetts, have invented an Improvement in Methods of Making Paste, of which the following description, in connection with the accompanying drawings, is a specification, like letters on the drawings representing like parts.

In the manufacture of paste as now practiced the flour and material used as the base is stirred into the water or liquid, and the mass is cooked; and in order to meet the demands of a competitive market a very cheap grade of flour has to be used, the particles thereof being rather coarse. The tenacity of paste made from flour depends upon the amount of gluten therein, which is exposed to the action of a solvent prior to the cooking process, and the amount of gluten which is so utilized depends upon the fineness of the particles of flour, such particles containing the gluten, and herein such coarsely-grained flour commonly used for paste and mixed ordinarily fails to produce a paste having the desired adhesive qualities.

In my experiments to produce a strong, uniform, and fine-grained paste without lumps, I have discovered that the materials of which the paste is to be made must be thoroughly broken up or triturated, and the compound made uniform in consistency and free from lumps before the cooking operation, as by such breaking up of the particles in the presence of a solvent no larger glutinous or nitrogenous particles remain to cohere with each other in the cooking operation, and thereby form lumps, and the glutinous properties contained in the flour are all set free to be acted upon by the solvent.

In accordance with my invention the material of which the paste is to be made is placed in the water or other liquid material or solvent to form part of the paste compound before cooking, and the said material and the water or liquid are subjected to the action of counter-currents established in a tank or vessel by agitators or beaters, the arms of which in their rotation come quite close together, acting to break up the particles by forcing particle against particle, thereby thoroughly triturating the mixture, setting free the glutinous properties, and bringing the mass to a uniform consistency, and in such condition the material is cooked in the usual manner.

In the manufacture of paste in accordance with my improved method many devices may be employed whereby counter-currents are established, and the one herein shown forms the subject-matter of another application, No. 134,322, filed June 9, 1884, reference to which may be had. In the said application the materials of which the paste is to be made are introduced into a tank divided by a partition, and in the said tank the material is subjected to the action of oppositely-revolving stirrers or agitators, which beat the particles one against another while the centrifugal action of the said stirrers, co-operating with suitable guides, forces the material forward along one side of and around the division-wall, and takes the material from an opening or throat on the other side of the division-wall, drawing the same again in between the agitators, thus creating counter-currents, which tend to establish a constant circulation, thereby producing a mixture free from lumps, all preparatory to cooking the same.

Figure 2:
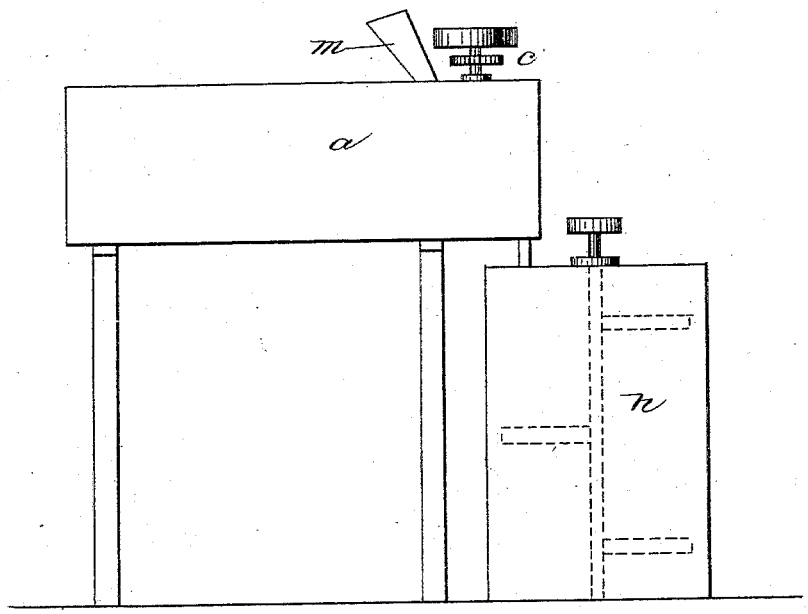

Figure 1 is a plan view of an apparatus for grinding or reducing flour preparatory to cooking the same for the production of paste in accordance with this invention, and Fig. 2 a side elevation on a smaller scale of the apparatus for completing the entire process.

In the apparatus herein described the flour, together with the water or other liquid solvent and other materials which are to be employed in the paste, are introduced into the tank $a$, which is preferably of oblong shape, and has a central longitudinal partition, $b$, extending for a portion of its length. The tank is provided with beaters or agitating devices $c$ $d$, mounted upon rotary shafts placed in one end of the tank and on each side of a line drawn longitudinally through partition $b$, said shafts being connected by gearing $c'$, Fig. 2, by which they are turned in opposite directions, as indicated by the arrows. The said agitators when in rapid rotation cause the solid material or flour, which is gradually introduced from above through a suitable chute or guide, $m$, Fig. 2, to be thoroughly commingled with the liquid solvent, the beating of the particles thereof against each other dividing them into a very fine state. The tank is provided with guides e f, the former extending from the side of the tank toward the axis of rotation of the nearest agitator, and the latter being between the side wall of the tank and the partition b, and having a direction nearly parallel with the said partition and side wall. By this arrangement the liquid thrown outward from the axis of rotation of the agitators first passes between the guides f and then between the partition and wall of the tank, and, passing around the partition, returns, as indicated by the arrows 4 5, the guides e at the other side preventing outward flow of the liquid from the agitators.

The guides e, together with the partition b, form an opening or throat leading to the beaters c d, through which the material is drawn by the said beaters, thus again subjecting the materials to the action of the beaters, and squeezing and grinding the particles upon each other, thereby breaking them into a very fine state. By the counter-currents thus produced at the opposite sides of the partition b the liquid will be kept in constant circulation, flowing along the tank at one side of the partition b in one direction, and at the other side of the said partition in the other direction, as indicated by the arrow 5.

In operation, the flour being introduced gradually at a point near the agitators, the liquid in its continual flow repeatedly subjects the flour to the action of the said agitators until the flour becomes thoroughly triturated or reduced to an exceedingly fine state, and the resulting fluid mass is of uniform consistency, entirely free from lumps.

In order to prepare the paste for use the liquid mass is drawn off from the tank a (see Fig. 2) into a boiler, h, in which it is boiled, while being constantly stirred by revolving arms i. When properly cooked, the paste is ready for use, and may be drawn off from the boiler h into barrels or other receptacles.

The composition of the paste may be of any suitable or usual character, the main ingredients being flour and water.

The essential function of the apparatus herein described is to establish counter-currents, whereby the particles of flour, &c., are caused to beat against each other, thereby dividing them infinitesimally, and setting free or exposing the entire amount of glutinous properties to the action of the liquid or solvent, and by this operation the glutinous properties are so thoroughly disseminated throughout the mass that when the mixture is cooked no glutinous particles by themselves are sufficiently large or have sufficient tenacity to cause other particles to cohere in such manner as to form lumps.

I claim—

The herein-described method of making paste, which consists in mixing the flour and other ingredients with water, thoroughly commingling the same by establishing counter-currents in the water, whereby the particles of flour and other ingredients contained therein and set in motion in opposite directions are caused to beat and rub against each other, thus thoroughly triturating the same and producing a mixture the particles of which are so finely divided that the entire glutinous properties are brought into contact with the liquid solvent, producing a mixture of uniform consistency free from lumps, and thereafter cooking the said mixture, substantially as described.

In testimony whereof I have signed my name to this specification in the presence of two subscribing witnesses.

OLDIN NICHOLS.

Witnesses:
FRED L. EMERY,
W. H. SIGSTON.